United States Patent Office 3,564,737
Patented Feb. 23, 1971

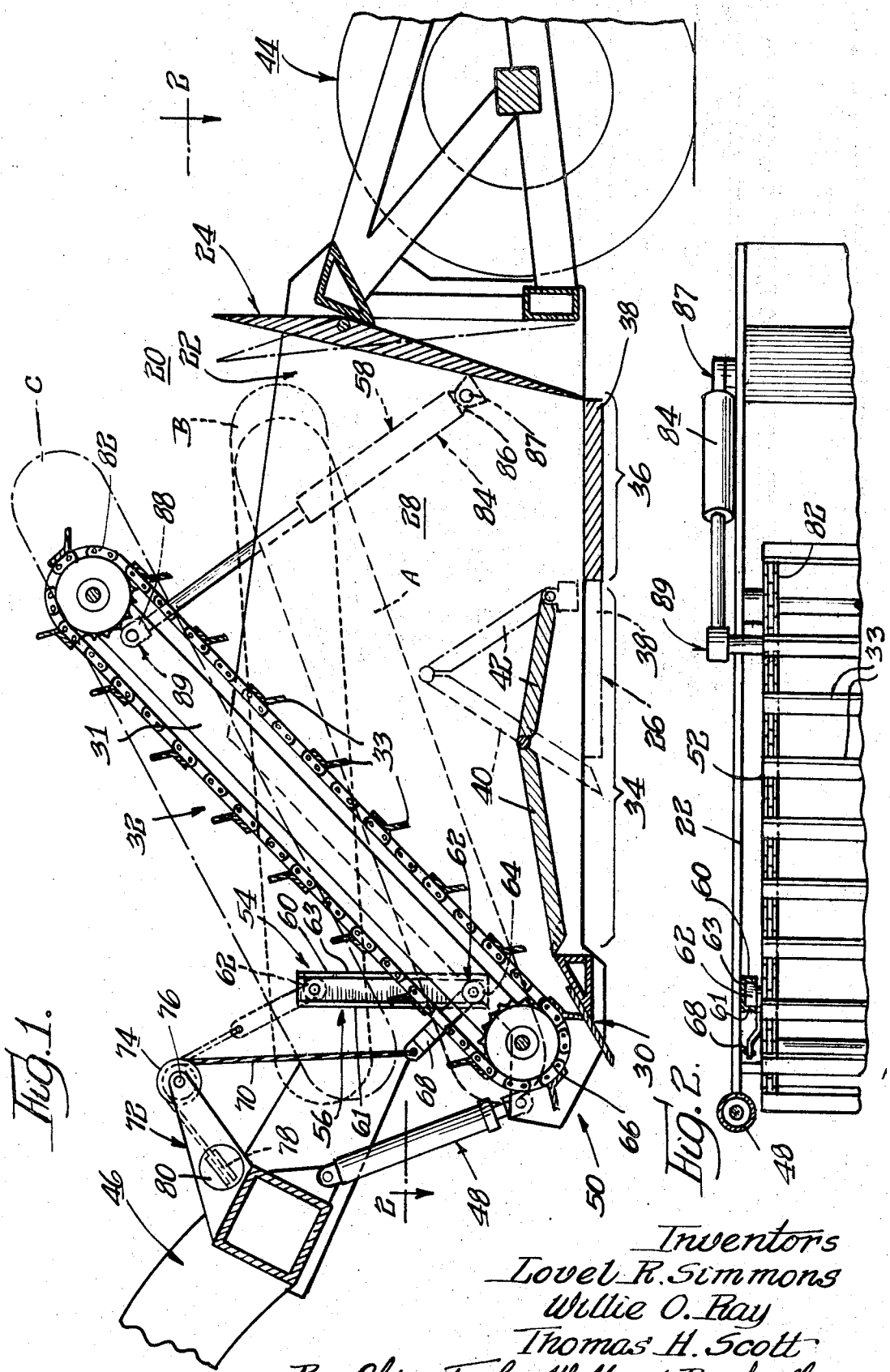

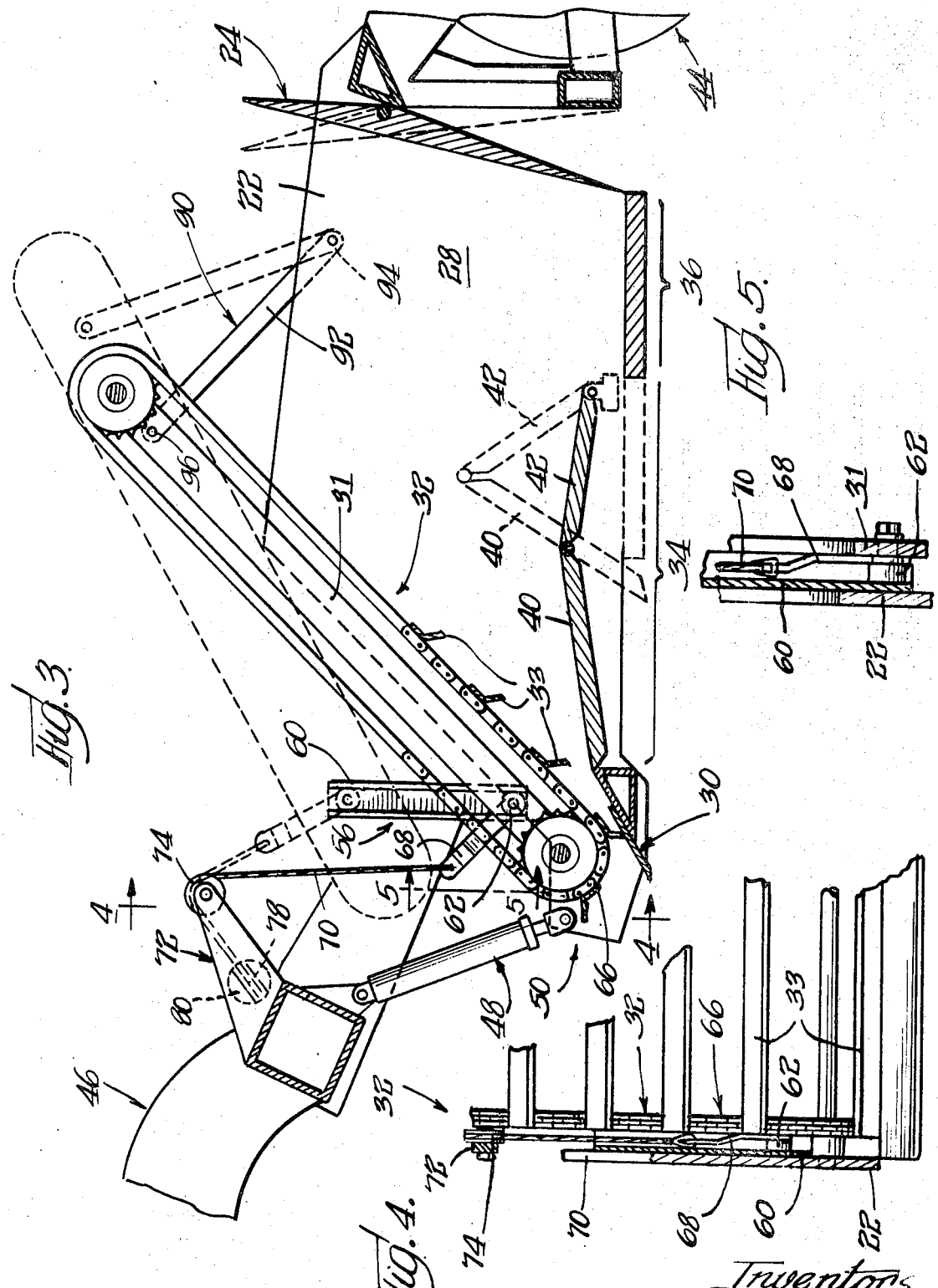

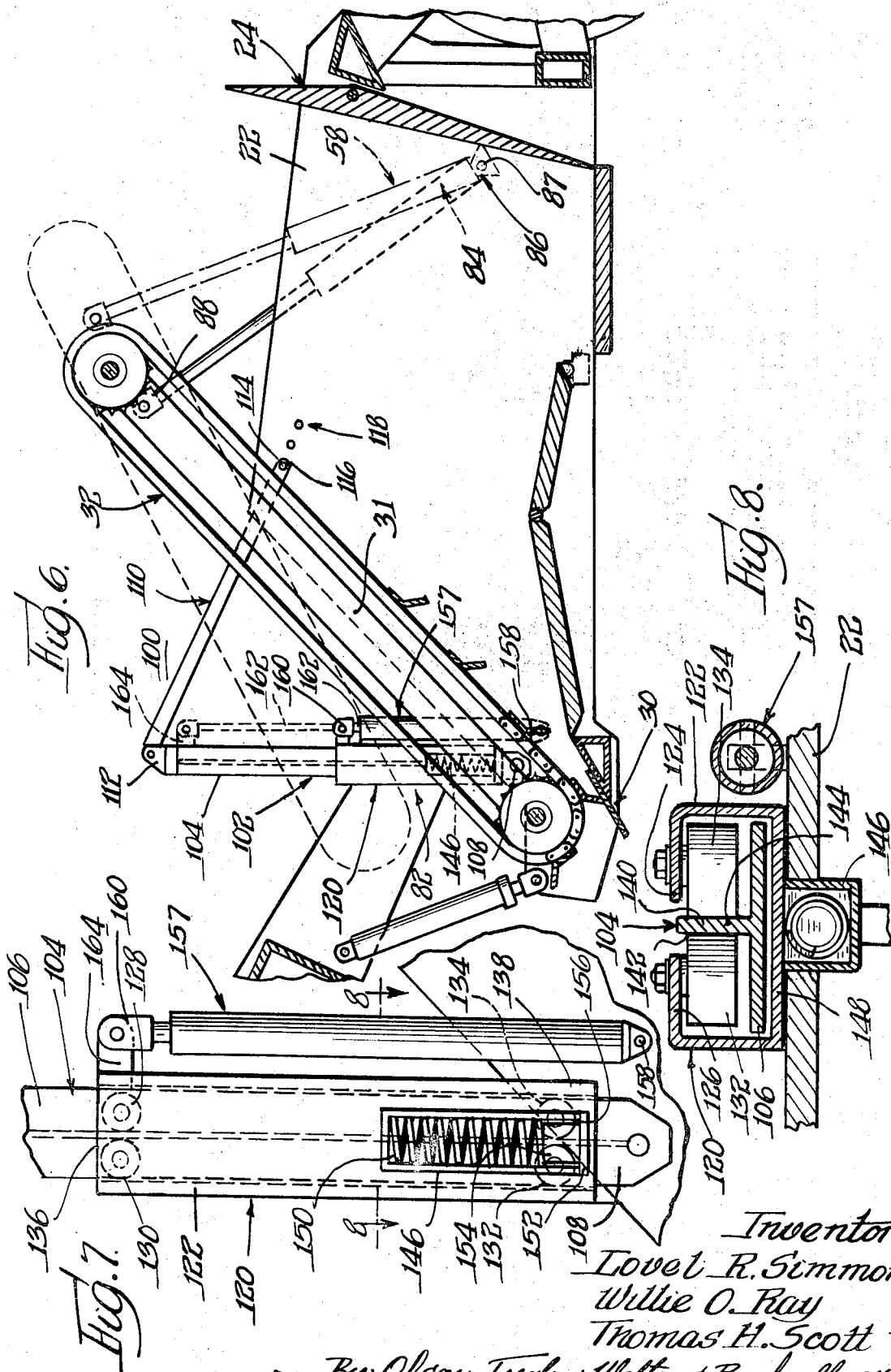

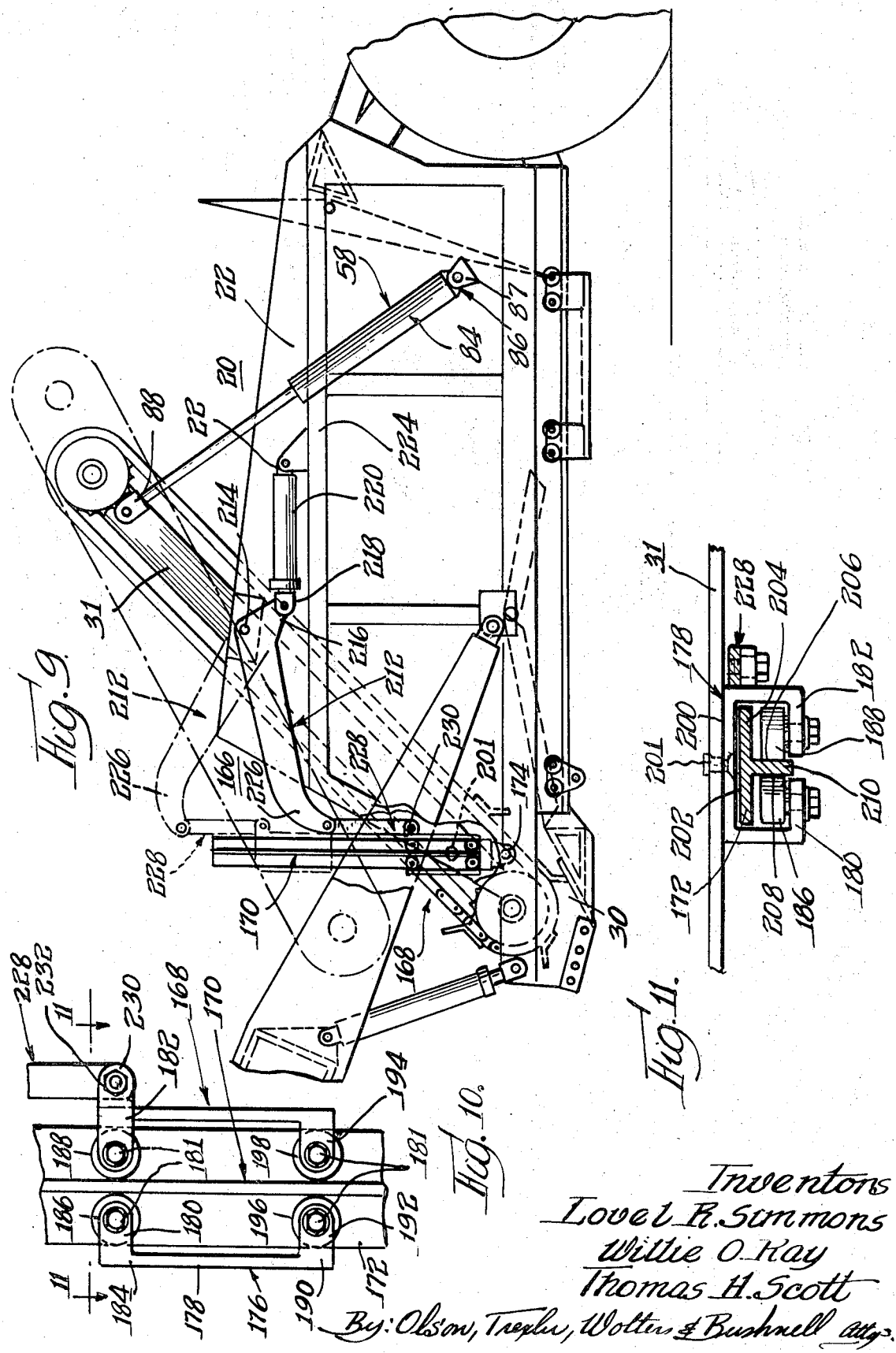

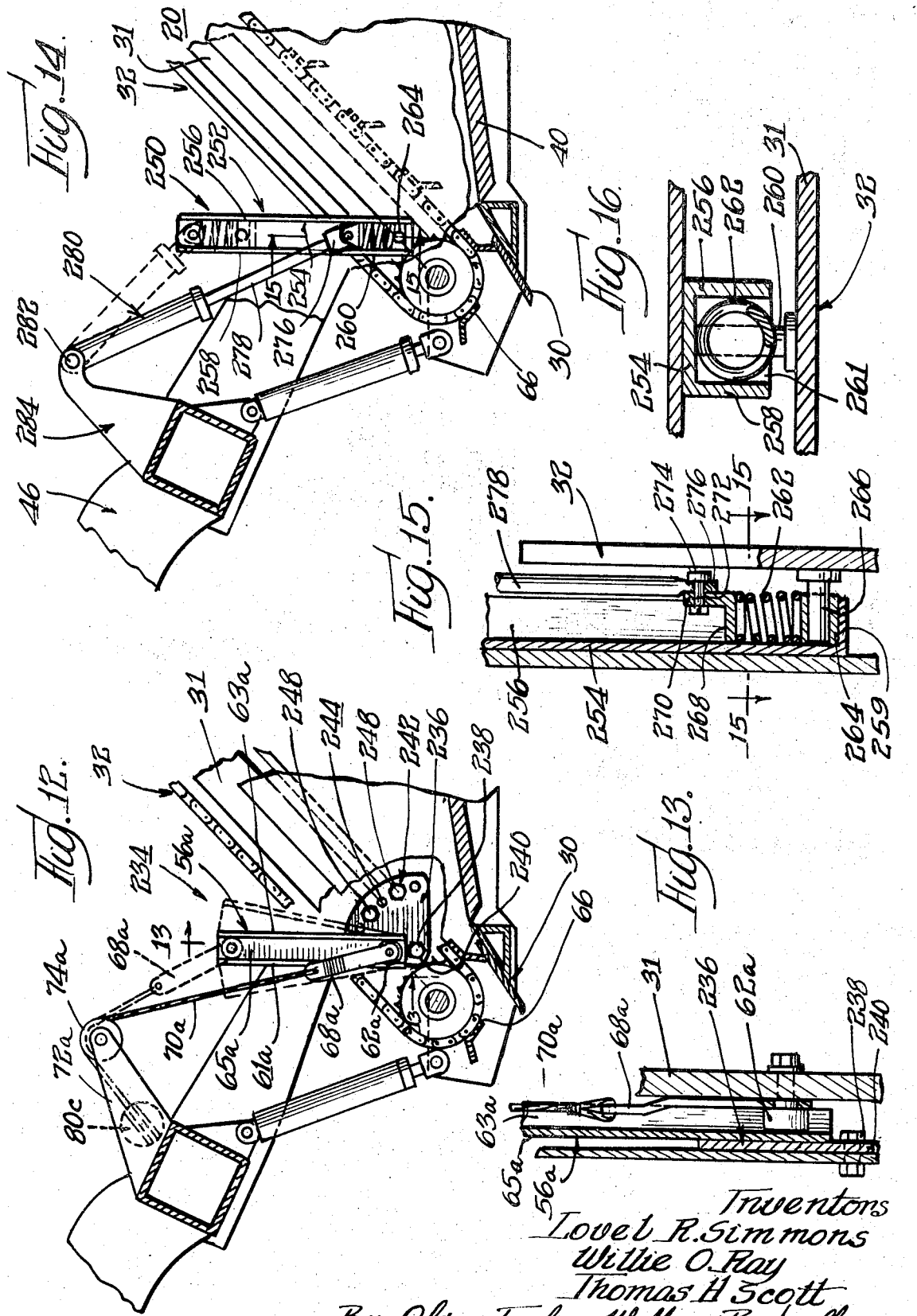

3,564,737
EARTH MOVING VEHICLE
Lovel R. Simmons, Willie O. Ray, Jr., and Thomas H. Scott, Jackson, Miss., assignors to M-R-S Manufacturing Company, Flora, Miss., a corporation of Delaware
Filed Dec. 20, 1968, Ser. No. 785,532
Int. Cl. B60p 1/36
U.S. Cl. 37—8
24 Claims

ABSTRACT OF THE DISCLOSURE

A positive drive and mounting assembly for an elevator conveyor of an earth moving vehicle comprising a front mounting and drive arrangement including a pair of substantially vertically oriented guide members, one of which is mounted on each side wall of the vehicle, a carriage member mounted for movement on each one of the guide members and attached to a respective side of the front end of the elevator conveyor, and drive means for moving the carriage members along respective guide members and thereby positively to position the elevator conveyor with respect to an earth scraper mounted at the lower front end of the vehicle. A rear mounting arrangement also is provided pivotally to connect the rear end of the elevator conveyor to the side walls of the vehicle. The rear mounting arrangement also may be positively driven.

BACKGROUND OF THE INVENTION

This invention relates generally to earth moving equipment and more particularly to an earth moving vehicle of the type including an elevator conveyor.

Earth moving vehicles which have movable elevator conveyors of the type disclosed in copending application Ser. No. 685,009, filed Nov. 22, 1967, for Method and Apparatus for Moving Earth and the Like Materials, L. R. Simmons, are versatile and efficient. Vehicles of this type have the capability of positively moving the elevator conveyor thereof to a desired position for accommodating practically any type or composition of earth or other materials encountered thereby.

An important part of an earth moving vehicle of the above-described kind, is the assembly for mounting and positively positioning or driving the elevator conveyor.

SUMMARY OF THE INVENTION

Accordingly, it is a primary object of this invention to provide a new and improved mounting and drive assembly for an elevator conveyor of an earth moving vehicle of the above-described type.

It is a further object of this invention to provide a new and improved earth moving vehicle which includes a positively positionable elevator conveyor.

It is a more specific object of this invention to provide a mounting and drive assembly for positively positioning the elevator conveyor of an earth moving vehicle of the above-described type which includes a stationary vertical guide member upon which a movable carriage or the like mechanism rides to lift or drop the front end of the elevator conveyor with respect to a front earth scraper of the vehicle.

DESCRIPTION OF THE DRAWINGS

A better understanding of the present invention and its organization and construction may be had by referring to the description below in conjunction with the accompanying drawings wherein:

FIG. 1 is a side, partially sectioned view of an earth moving vehicle including an elevator conveyor mounted for positive movement by means of one embodiment of a positive drive assembly according to the invention;

FIG. 2 is a fragmentary sectional view of the earth moving vehicle of FIG. 1 taken along the line 2—2 thereof;

FIG. 3 is a side, partially sectioned view of an earth moving vehicle including an elevator conveyor mounted for positive movement by means of a side assembly similar to that of FIG. 1, except with a modified rear mounting mechanism;

FIG. 4 is a front sectional view of the earth moving vehicle of FIG. 3 taken along the line 4—4 thereof;

FIG. 5 is an enlarged sectional view of the earth moving vehicle of FIG. 3 taken along the line 5—5 thereof illustrating an embodiment of a roller carriage and stationary vertical guide member of an elevator drive assembly according to the invention;

FIG. 6 is a side, partially sectioned view of an earth moving vehicle including an elevator conveyor mounted thereon by means of another embodiment of the positive drive assembly according to the invention;

FIG. 7 is an enlarged side view of the front drive mechanism, including a carriage and stationary guide member of the drive assembly of the earth moving vehicle of FIG. 6;

FIG. 8 is an enlarged cross-sectional view of the front drive mechanism of FIG. 7 taken along the line 8—8 thereof, and illustrating the relation between the movable carriage and vertical guide member thereof;

FIG. 9 is a side plan view of an earth moving vehicle including an elevator conveyor mounted thereon by means of still another embodiment of a positive drive assembly according to the invention;

FIG. 10 is an enlarged fragmentary side view of a carriage and vertical guide member of the drive assembly of the earth moving vehicle of FIG. 9;

FIG. 11 is a cross-sectional view of the carriage and guide member of FIG. 10 taken along the line 11—11 thereof;

FIG. 12 is a side, partially sectioned, fragmentary view of an earth moving vehicle including a positively driven elevator conveyor mounted at the front end thereof to the vehicle by means of still another embodiment of a front drive mechanism;

FIG. 13 is a front sectional view of the front drive mechanism of FIG. 12 taken along the line 13—13 thereof;

FIG. 14 is a side, partially sectioned, fragmentary view of an earth moving vehicle including a positively driven elevator conveyor mounted at the front end thereof to the vehicle by means of yet another embodiment of a front drive mechanism;

FIG. 15 is a front sectional view of the front drive mechanism of FIG. 14 taken along the line 15—15 thereof; and FIG. 16 is a cross-sectional view of the front drive mechanism of FIG. 15 taken along the line 16—16 thereof.

DETAILED DESCRIPTION

Referring now to the drawings in greater detail, an earth moving vehicle 20 of the scraper and carrier type, including a positively driven elevator conveyor, is shown in FIG. 1. The vehicle is similar to that of copending patent application, Ser. No. 685,009, entitled "Method and Apparatus for Moving Earth and the Like Materials," filed Nov. 22, 1967, and includes a pair of spaced-apart, parallel, longitudinally extending side walls 22 (only one of which is shown) joined by a pivotal rear wall 24 extending transversely between the side walls 22 and a bottom wall or floor 26 supported by the side walls to define a bowl or container 28 into which earth and other materials are loaded by moving the vehicle forward and scraping material thereinto over a cheater bit or blade 30, aided by a positively driven elevator conveyor 32 having side frame members 31. The bottom wall or floor 26 of the vehicle, like the vehicle of the above-mentioned application, includes forward and rearward sections, 34 and 36, respectively, which are hydraulically operated to open sequentially so as to dump the earth or the like material from the bowl 28 as described in the copending application. In the preferred earth moving vehicle embodiment disclosed in the instant application, the rearward section 36 includes a forwardly sliding panel 38, and the forward section 34 includes a pair of interconnected pivotally hinged panels 40 and 42 which are movable from a closed position shown in solid lines to an open position shown in dotted lines so as to dump the material from bowl 28.

The vehicle 20 is in the nature of a trailer and conventionally includes a rear wheel assembly 44 and a yoke or connector frame 46 at the front thereof for connection to a prime mover or tractor (not shown). The relationship between a vehicle such as trailer 20 and a prime mover can be seen in Ray et al. Pat. No. 3,343,286, issued Sept. 26, 1967. A hydraulic cylinder arrangement 48 connected between the yoke and the front end of the bowl is provided to raise and lower the front end 50 of the bowl, including scraper 30, with respect to the earth, so that a desired amount of earth may be forced into the bowl 28 upon movement of the vehicle in a forward direction.

The elevator conveyor 32 is mounted on the sidewalls 22 of the vehicle for positive movement in relation to scraper 30. A mounting and positive drive assembly 54, including a front end mounting arrangement 56 and a rear end mounting arrangement 58, is provided for the vehicle of FIGS. 1 and 2. Through the use of the drive and mounting assembly 54, the lower front end of elevator conveyor 32 can be positively moved to a desired position with respect to the blade or bit 30 of the vehicle; some of the positions being illustrated in dotted lines in FIG. 1. This becomes advantageous when working with materials of different texture and composition, such as, for example, lumpy earth material, sand, large rocky material, etc.

The front end mounting arrangement 56 comprises a pair of guide members or tracks 60 each comprising an elongated plate member 65 having a pair of parallel, right angle guide flanges 61 and 63 formed therewith on opposite sides thereof at right angles thereto. One of the guide members is welded or otherwise fixedly mounted on each sidewall 22 of the vehicle at the lower end of plate member 65. Only one such guide member is shown, however, in the drawing. A carriage or roller assembly 62 is mounted between flanges 61 and 63 for movement in a vertically upward or downward direction on each of the guide members. Each roller assembly is rotatably mounted by means of a pin 64 to a respective side of the front end 66 of the elevator conveyor 32. A link arm 68 is fixedly connected to the front end 66 of the elevator conveyor 32 and is attached at the other end to a respective steel cable 70.

A pair of support arms, each designated 72, is mounted on opposite sides of yoke 46 and extends rearwardly therefrom toward the trailer 20. A pulley 74 is mounted on each arm 72 by means of a pin 76. The cables 70, one from each side of trailer 20, are fed upwardly from a respective arm 66 over a corresponding pulley 74 and are connected at the free ends thereof to a suitable hydraulic actuator 80 such as a cylinder and sleeves or a rotatable shaft driven by a motor mounted on yoke 46. The hydraulic actuator 80 is operable to retract cable 70 and thereby to cause the respective roller carriages 62 to be moved upwardly along corresponding guide tracks 60 positively to position the front end 66 of the elevator conveyor 32 with respect to scraper blade 30 of the vehicle.

The rear end 82 of the elevator conveyor is also mounted from the side walls 22 of trailer 20, by the rear end mounting arrangement 58, including a pair of hydraulic cylinders 84. One end 86 of each of the cylinders is pivotally mounted by means of a pin and bracket arrangement 87 (FIG. 2) on a respective sidewall 22, and the end 88 of the piston portion of the hydraulic cylinder is pivotally mounted by means of a second rod and bracket arrangement 89 (FIG. 2) to a respective side of the rear end of elevator conveyor 32. In this manner the rear of the conveyor may be positively positioned independently of the front end thereof.

A number of the many positions to which elevator conveyor 32 is movable are shown in dotted lines in FIG. 1. The solid line position is the most common loading position. The position of elevator conveyor 32 designated A, is one in which earth and other materials can be gathered into the vehicle bowl 28 by conveyor 32 over the blade 30 as the vehicle is moved in a forward direction. When the elevator conveyor 32 is operated; i.e., slats 33 thereof are moved about the conveyor structure, earth material is drawn into the bowl thereby and is pushed to the rear of the bowl.

The elevator conveyor in position B can be used to move materials already in bowl 28 to the rear thereof. This is described in more detail in the co-pending application referred to heretofore. When the elevator conveyor is in or approaching position C, the vehicle may be used to load large lumpy or rocky material merely by forcing the material over blade 30 as the vehicle is driven in a forward direction, the elevator conveyor being out of the way so as not to be damaged by the large material. This position also is useful for traveling with a full load. The positions discussed are only three of many to which the elevator conveyor may be positively moved by drive assembly 56.

The elevator conveyor mounting and drive assembly of FIG. 3 is similar to that shown in FIG. 1, except that the rear mounting arrangement 90 is modified slightly. Whereas the rear mounting arrangement 58 of FIG. 1 is capable of positively moving the rear end of conveyor 32, independently of the positive drive arrangement at the front of the conveyor, the arrangement 90 merely acts as a follower and moves in accordance with the positive movement of the front assembly 54.

The mounting arrangement 90 comprises a pair of steel bars of a predetermined length, each designated 92, pivotally mounted at one end 94 to a respective side wall 22 of the vehicle near the rear end of the latter. The other end 96 of each of the bars is pivotally mounted to a respective side of the rear end of the elevator conveyor 32. The arrangement 90 limits the movement of the elevator conveyor as compared with that of the assembly of FIG. 1, since the length of the bar 92 is fixed. Nevertheless, a great many positions are obtainable with the arrangement of FIG. 3, at a substantially lower cost.

The front end mounting arrangement 54 is identical to that of the vehicle of FIG. 1 and, as mentioned above, provides the positive positioning movement for the elevator conveyor 32. In this case, the movement of roller or carriage 62 along vertical guide 60 positions the elevator conveyor.

The positioning of the elevator conveyor 32 by means of the assembly of FIG. 3 is possible between the two extreme positions shown therein. The lowermost position is shown in solid lines with the carriage 62 being at the lower end of the guide track 60, and the uppermost position is shown in dotted lines with the carriage 62 being at the upper end of the guide track 60. The movement of the rear end of the elevator conveyor on follower bars 92 may be seen in the figure also in two extreme positions. As will be understood, the position of the conveyor is continuously variable between the two extremes shown.

FIGS. 4 and 5 illustrate clearly the relation of the front drive assembly 56, a side wall 22 of the vehicle and the elevator conveyor 32. As can be seen therein, roller assembly 62 is mounted adjacent the lower, front end 66 of elevator conveyor 32 and is mounted for rolling engagement on guide track 60, which is itself mounted on side wall 22. Cable 70 can be seen extending upwardly and passed over pulley 74 (FIG. 4).

The drive and mounting assembly 100 for the conveyor 32 of the vehicle of FIGS. 6–8 differs slightly in structure from those previously described. Assembly 100 comprises a front end mounting arrangement 102 for shifting the front end of elevator conveyor 32, and includes a pair of vertically extending guide rails or tracks each designated 104 (only one of which is shown). Each guide rail 104 is formed of a steel beam 106 having a T-shaped cross-section, shown best in FIG. 8. The beam 106 is pivotally mounted at the lower end 108 thereof to a respective side wall 22 of the vehicle and is pivotally attached to a steel stabilizing arm 110 at the top end 112. Each stabilizing arm 110 is in turn pivotally mounted at its opposite end 114 by means of a removable pin or bolt arrangement 116 inserted in one of a series of apertures 118 along the upper end of a respective side wall 22. By selective insertion of pin 116 in apertures 118, the guide rail 104 may be positioned angularly about pivot point 108 away from the vertical, thus making it possible, as will be explained in greater detail hereinafter, further to adjust the positioning of the elevator conveyor 32.

A carriage assembly 120 is mounted for movement along guide rail 104. The carriage assembly 120, best seen in FIGS. 7 and 8, includes a housing or trolley 122 having a generally U-shaped cross-section wherein the free ends of the legs are bent in to confronting relation as flanges 124 and 126. Pairs of rollers 128, 134 and 130, 132, respectively, are mounted on these flanges. As can be seen in FIG. 7, two rollers 128 and 130 are mounted near the upper end 136 of housing 122, and the other rollers 132 and 134, are mounted near the lower end 138 of the housing. The housing is mounted on guide rail 104 for movement therealong (FIG. 8), with rollers 128, 130, 132, 134 engaging opposite side surfaces 140, 142, respectively, of the stem or center flange 144 of the T beam 104. A smaller enclosure or spring cage 146 is mounted along the bight 148 of housing 122 in fixed relation thereto and includes a helical or coil spring 150 mounted therein. A floor 152 is fixed to lower end 138 of the spring cage, and a stop portion or block 154 is trapped between spring 150 and floor 152. Block 154 is pivotally mounted on conveyor frame 31. The spring mounting provides for positive raising of block 154 by the trolley, but allows the block to raise up against the force of spring 150 when unusually large pieces of earth or the like material are being loaded into the vehicle 20. Through the cushioning action of coil spring 150, damage to elevator conveyor 32 from such large material is prevented, since the elevator conveyor is free to move against spring 150, allowing the large material to pass therebeneath.

The carriage assembly 120 is raised or lowered by means of a hydraulic cylinder 157, mounted adjacent the assembly. The lower end 158 of the cylinder housing is pivotally mounted on a respective side wall 22 of the vehicle adjacent the lower end of the carriage assembly and extends vertically upward in parallel relation with respect to the carriage assembly. The free end 160 of the piston 162 of hydraulic cylinder 157 is pivotally connected to an extension 164 of the upper end 136 of the carriage assembly. Thus, when hydraulic cylinders 157 of both carriage assemblies of the vehicle are operated to extend respective piston arms 162, as shown in dotted lines in FIG. 6, the carriage assemblies 120 are raised upwardly positively to position the front end 66 of elevator conveyor away from front scraper 30 of the vehicle. The pivotal mounting of the upper and lower ends of the hydraulic cylinder enables the cylinder and carriage assembly to be in operative relation with each other upon repositioning of the end 114 of bar 110 in the series of holes 118 provided in respective side walls 22 so as angularly to move the guide assembly with respect to the vertical.

The rear mounting arrangement of the elevator conveyor 32 is like arrangement 58 of FIG. 1, and thus need not be discussed in detail herein. The component parts of the rear mounting arrangement of FIG. 6 have been numbered with the same numerals as those used in FIG. 1 for clarity.

Still another embodiment 166 of a mounting and drive assembly for the elevator conveyor 32 of vehicle 20 is shown in FIGS. 9–11 of the drawings. The front end drive and mounting arrangement 168 includes a pair of vertically extending guide rails, each designated 170 (only one of which is shown) which are similar to the guide rails of FIGS. 6–8. Each guide rail 170 includes a steel beam 172 having a T-shaped cross-section which is fixed at the lower end 174 thereof on a respective side wall 22 of the vehicle.

A carriage assembly 178 similar to but not exactly like the carriage assembly of FIGS. 6–8 is mounted on each of the guide rails 170 in rolling engagement therewith for movement vertically along the rail. The carriage comprises a housing 178 having a U-shaped cross-section (FIG. 11). A pair of inwardly extending arms 180, 182, is provided at the upper end 184 of the carriage and each has mounted thereon by means of a threaded bolt arrangement 181 a roller 186, 188, respectively, likewise, the lower end 190 of the carriage housing includes a pair of inwardly extending arms 192, 194, each with a roller 196, 198, respectively, mounted thereon by means of threaded bolt arrangements 181. The carriage housing is mounted on beam 172 with the bight portion or wall 200 of the carriage positioned adjacent the outer surface 202 of the cross-bar portion 204 of the T-beam (FIG. 11), the wall 200 being pivotally fixed to the adjacent frame member 31, at 201. Rollers 186, 188, 192, 194, engage the outer surfaces 206, 208, respectively, of the base bar 210 of the T-beam 172, and roll therealong, thereby to guide the carriage vertically upwardly and downwardly thereon. Each of the pair of roller carriages 168 used to drive elevator conveyor 32 is mounted near opposite ends of the elevator conveyor to positively position the last-mentioned end thereof with respect to the front scraper 30 of the vehicle.

To drive the roller carriages along rails 170, there is provided for each one thereof, a hydraulically driven lever arm 212 pivotally mounted on a respective upper portion of a corresponding side wall 22 of the vehicle by means of a pin 214. One end 216 of the lever arm is connected pivotally to the driver piston 218 of a hydraulic cylinder 220, which itself is pivotally mounted at the cylinder housing end 222 thereof to a side reinforcing beam 224 attached to side wall 22 of the vehicle. The other end 226 of arm 212 is pivotally attached to the upper end of a connecting rod 228, which in turn is connected pivotally at its lower end 230 to a lateral extension 232 at the upper end 184 at one side of the carriage. Thus, upon the operation of hydraulic cylinders 220, driver arms 212 are pivoted about pins 214 to lift or drop the front end of the elevator conveyor 32.

The rear mounting arrangement for elevator conveyor 32 is like that of FIGS. 6–8 and will not be discussed in detail herein. The numerals used to designate component parts of the rear mounting and driver arrangement are the same as those used in FIGS. 6–8.

Other front mounting arrangements which may be used positively to position the front end of elevator conveyor 32 are shown in FIGS. 12, 13 and FIGS. 14–16.

The front mounting arrangement 234 of FIGS. 12, 13 is similar to that of FIG. 1; thus parts thereof which are the same as those of FIG. 1 have been given like numerals with the suffix *a* added thereto.

The mounting arrangement comprises a guide track 56a having a U-shaped cross-section, including an elongated plate 65a having formed integrally therewith at right angles thereto, a pair of rails 61a and 63a, between which a roller 62a is mounted for movement. A fan-shaped mounting plate 236 is connected by welding, etc., to the rear plate 65a at the lower end thereof. The fan-shaped plate 236 is pivotally mounted by means of a bolt member 238 at the apex 240 of the fan-shaped mounting plate. A series of apertures 242 is provided adjacent the outer, arcuate edge 244 of the mounting plate. A like series of apertures (not shown) is likewise formed in each of the side walls 22 in alignment with respective apertures in a corresponding mounting plate. Bolt members 248 are passed through one or more pairs of aligned apertures to secure the guide track in a substantially vertically oriented position on a respective side wall 22 of the vehicle. As shown in dotted lines in FIG. 12, the guide member 56a may be adjusted angularly away from or toward the front end of the vehicle about bolt member 238, to position the elevator conveyor 32 closer to or farther from scraper 30 at the front of the vehicle along the guide member.

The front mounting arrangement 250 of FIGS. 14–16 includes at either side a vertical guide 252, similar to that of the arrangement of FIGS. 12, 13, having a U-shaped cross-section. The guide 252 includes a vertically elongated plate 254 fixed to a side wall 22 of the vehicle 20, and a pair of right angle integral flanges 256, 258 extending along opposite sides of the plate. A floor or bottom wall 259 is disposed at the lower end of each guide 252. A carriage assembly 260 is mounted between flanges 256, 258 for movement in a vertical direction. Unlike the carriage assemblies described heretofore, the assembly 260 does not include a roller, but rather includes a slidably mounted block 264 fixed to the lower end of a coil spring 262 (best seen in FIG. 15). Block 264 is pivotally connected via pin 266 to a respective side of the front end of elevator conveyor 32. A bracket 268 is fixed to coil spring 262 at the upper end thereof and includes a flange 270 having an aperture 272 therethrough for receipt of a pin 274 which also extends through the end element 276 of the connecting rod 278 of a hydraulic cylinder 280, which is connected at the other end 282 thereof to a support arm arrangement 284 extending upwardly and rearwardly from yoke 46 of the vehicle. Through the operation of hydraulic cylinder 280, coil spring 262 is moved upwardly or downwardly between flanges 256, 258 of a guide track 252. The movement of spring 262 in turn causes the front end of elevator conveyor 32 to be moved away from or toward blade or bit 30.

The coil spring 262 acts as a shock absorber and as an impositive connection at the front end of elevator conveyor 32 both upwards and downwards. In the event an unusually large piece of earth material, such as rock, etc., is forced between the front end of the conveyor and scraper 30, the force of the passage of the rock between the conveyor and scraper will be taken up by spring 262, to avoid damage to the elevator conveyor 32. Conversely, the spring will stretch if the conveyor should be jammed in lowered position when efforts are made to raise it.

It should be understood that the front drive arrangements of FIGS. 12–16 may be used with any of the rear mounting arrangements heretofore shown and described. Likewise, the several rear and front drive and mounting arrangements may be used together in any combination desired.

While preferred embodiments of the invention have been shown and described, it should be understood that the invention is not limited thereto, since many modifications may be made. It is therefore contemplated to cover by the present application any and all such modifications as fall within the true spirit and scope of the appended claims.

What is claimed is:

1. A vehicle for transporting earth and other materials, said vehicle comprising: a bowl for carrying earth or the like, an elevator structure, and a mounting and drive assembly for supporting said elevator structure on said vehicle for positive movement in relation to said bowl, said assembly comprising rear end mounting means for movably mounting the rear end of said elevator structure relative to said bowl and a front end mounting arrangement including vertically extending guide means fixedly mounted adjacent the front of said bowl, said guide means comprising a pair of guide tracks, one mounted on either side of said bowl and extending vertically upward, carriage means defined by a pair of carriage members mounted for movement along said guide tracks and attached to the front end of said elevator structure, said guide tracks including means confining the carriage members to linear, substantially vertical movement along said tracks and power means for positively driving said carriage means along said guide means, thereby to position said elevator structure with respect to said bowl.

2. A vehicle as claimed in claim 1 wherein each of said carriage members includes at least one roller mounted in rolling engagement with a respective one of said guide tracks.

3. A vehicle as claimed in claim 1 wherein said power means includes hydraulic actuator means mounted on said vehicle, cable means attached to said carriage members and connected to said hydraulic actuator means, whereby upon operation of said hydraulic actuator means, said cable means are moved to raise or lower the front end of said elevator structure along said guide tracks.

4. A vehicle as claimed in claim 1 wherein each of said guide tracks includes a beam having a T-shaped cross-section, attached at one end thereof to a respective sidewall of said vehicle near the front end of the latter, and wherein each of said carriage members includes a housing having a generally U-shaped cross-section mounted on said T-beam with the bight portion of said housing being adjacent the cross bar element of said T-beam, the legs of the U-shaped carriage member facing inwardly in opposing relation and including at least one roller mounted on each said leg, said rollers engaging opposite surfaces of the base bar element of said T-beam, whereby upon the operation of said drive means, each of said carriage members rolls along a respective T-beam to position said elevator structure.

5. A vehicle as claimed in claim 4 wherein the lower end of each of said T-beams is pivotally mounted on a respective side of said bowl and wherein said guide means further includes an adjustable stabilizing arm pivotally mounted at the upper end of each of said T-beams, at one end thereof and adjustably mounted to a respective side of said bowl at the other end thereof, whereby upon adjusting the position of each of said stabilizing arms the corresponding T-beam is pivoted about the lower end thereof to be positioned angularly from the vertical.

6. A vehicle as claimed in claim 1 wherein said power means comprises a pair of hydraulic cylinders, each being pivotally mounted at the free end of the cylinder housing thereof at a respective side of said bowl, and a free end of the piston of each of said cylinders being pivotally coupled to a respective one of said carriage members, whereby upon actuation of said hydraulic cylinders, said carriage members are moved along said guide tracks, thereby to position said elevator structure with respect to said bowl.

7. A vehicle as claimed in claim 6 wherein said power means further includes a pair of arm members, each of which is pivotally mounted at a respective side of said bowl with a first end thereof pivotally attached to a respective one of said carriage members and the second end thereof pivotally connected to the free end of a piston of a corresponding one of said hydraulic cylinders 8. A vehicle as claimed in claim 1 wherein said rear mounting means includes a pair of hydraulic cylinders, each being mounted at a first end thereof at one side of said bowl adjacent the rear thereof, and a second end thereof being connected pivotally to a respective side of the rear portion of said elevator structure.

9. A vehicle as claimed in claim 1 wherein each of said carriage members includes a coil spring member slidably mounted on a respective one of said guide tracks.

10. A positive drive and mounting assembly for an elevator conveyor of an earth moving vehicle including a pair of substantially vertically mounted side walls and an earth or the like scraper mounted at the forward end of the vehicle between and at the lower end of said side walls, said assembly comprising a front end mounting arrangement including a pair of guide members, each of which is mounted on a respective one of said side walls near the forward end of said vehicle, and extends upwardly therefrom in a substantially vertical position, a pair of carriage members, each of which is pivotally connected to a corresponding side of said elevator conveyor adjacent the front end of the latter, said guide members including means confining said carriage members to linear, substantially vertical movement therealong and power means for positively moving said carriage members along said guide members, and a rear end mounting arrangement including a pair of mounting members, each of which is pivotally connected at a first end thereof to a respective side wall near the rear of the latter and pivotally connected at the second end thereof to a corresponding side of the rear end of said elevator conveyor, whereby upon movement of said carriage members along said guide members said elevator conveyor is positively positioned with respect to said scraper.

11. A drive and mounting assembly as claimed in claim 10 wherein each of said guide members comprises an elongated plate member having a pair of flanges along opposite sides thereof and spaced apart in parallel relation to each other, said flanges being substantially at right angles to said plate member and extending from a first surface thereof, wherein each of said carriage members includes a roller mounted between said flanges for movement therealong by said power means.

12. A drive and mounting assembly as claimed in claim 10 wherein each of said carriage members includes a coil spring mounted for sliding movement along a respective one of said guide members.

13. A drive and mounting assembly as claimed in claim 10 including means pivotally mounting said guide members to respective ones of said side walls, and means for locking said guide members in adjusted pivoted position to said respective side walls.

14. A drive and mounting assembly as claimed in claim 13, wherein the mounting means of each of said guide members includes a fan-shaped mounting plate connected to said guide member, wherein the apex of each said mounting plate is pivotally connected to a respective side wall of said vehicle and a remote portion of said fan-shaped plate includes a plurality of mounting points arranged in a predetermined pattern, whereby upon changing the mounting point of said fan plate with respect to said side wall, said guide member is angularly repositioned about said pivotal connection.

15. A drive and mounting assembly as claimed in claim 10, wherein each of said guide members includes a track having a T-shaped cross-section, and mounted at one end thereof to a respective side wall of said vehicle near the forward end of the latter, each of said guide tracks extending substantially vertically upwardly along said side wall, and wherein each of said carriage members includes a housing mounted on a respective one of said guide tracks with at least a pair of rollers connected to said housing and being in rolling engagement with opposite surfaces of the support bar element of said T-shaped guide track for movement therealong.

16. A drive and mounting assembly as claimed in claim 10, wherein said rear end mounting arrangement includes a pair of bar members of a predetermined length, each being pivotally mounted at one end thereof to a respective side wall of said vehicle and pivotally mounted at the opposite end thereof to a corresponding side portion of the rear of said elevator conveyor, whereby upon movement of said elevator conveyor by means of said front drive means, the rear end of said elevator conveyor moves accordingly on said bar members.

17. In an earth moving vehicle including; a bowl defined by a pair of spaced-apart side walls, a rear wall mounted between said side walls and a base wall forming a container for earth or the like materials, and further including a scraper mounted between said side walls at the forward end of said vehicle and an elevator conveyor for moving materials into said container over said scraper, a positive mounting and drive assembly for said elevator conveyor; comprising: rear end mounting means for movably mounting the rear end of said elevator structure relative to said bowl, and a front end mounting arrangement including generally vertically extending guide means defined by a pair of guide tracks, one mounted at either side of said bowl and extending vertically upward, carriage means including a pair of carriage members mounted for movement along said guide means and connected to the front end of said elevator conveyor, said guide means including means cooperable with said carriage members to confine said members to linear, substantially vertical movement therealong and drive means mounted on said vehicle in operable relation with said carriage means for positively moving said carriage means along said guide means, thereby to position said elevator conveyor with respect to said front scraper.

18. An earth moving vehicle as claimed in claim 17, wherein said guide tracks include a pair of elongated, substantially vertically extending guide rail members, wherein each said carriage member includes a pair of roller members, each mounted in rolling engagement on one of said guide rail members and pivotally secured to a respective side portion of a forward end of said elevator conveyor, and wherein said drive means includes motor means having a rotatable shaft and cable means connected to and interposed between said roller members and said shaft, whereby upon operation of said motor means said shaft is rotated to turn within said cable means thereabout, causing said roller members and the forward end of said elevator conveyor to be moved along said guide rail members.

19. An earth moving vehicle as claimed in claim 18, wherein said rear end mounting means for said elevator conveyor, includes a pair of elongated members, each pivotally connected at one end to a corresponding rear side portion of said elevator conveyor and pivotally connected at the opposite end to a respective side wall of said vehicle.

20. An earth moving vehicle as claimed in claim 19, wherein each of said elongated members of said rear end mounting means includes a hydraulic cylinder.

21. An earth moving vehicle as claimed in claim 17, wherein said guide tracks includes a pair of elongated, substantially vertically extending guide rails each having a T-shaped cross-section and each being mounted along the crossbar element of the T on a respective side wall of said vehicle near the forward end thereof, wherein said carriage members each include a housing with a generally U-shaped cross-section, said housing being mounted on a respective one of said T-shaped rails with the bight portion of said U being adjacent said crossbar element, and having the extreme leading ends of the legs of the U turned inwardly in opposing relation with respect to each other and each including a roller mounted thereon, said rollers being in rolling engagement with opposite surfaces of the base bar element of said T-shaped guide rails, and wherein said drive means includes a pair of hydraulic cylinders, each of which is mounted on a respective side wall of said vehicle and is connected to a respective one of said carriage members for moving said member along a respective one of said guide rails, thereby to position said elevator conveyor with respect to said scraper.

22. An earth moving vehicle as claimed in claim 21, wherein said guide rails are pivotally mounted on respective side walls, and wherein said guide means further includes a pair of adjustable stabilizing bars, each being adjustably connected to and mounted between one of said guide rails and a respective one of said side walls, whereby upon adjusting the position of said stabilizing bars said guide rails are moved angularly about said pivotal mounting point away from the vertical.

23. An earth moving vehicle as claimed in claim 21, wherein each of said carriage members further includes a coil spring member for dampening the movement of said elevator conveyor.

24. A vehicle for transporting earth and other materials, said vehicle comprising: a bowl having a pair of spaced-apart, longitudinally extending side walls, a transversely extending rear wall connected to said side walls at a rearward end of the vehicle, and a base wall connected to said walls for supporting the materials loaded into the vehicle; an elevator structure supported by said side walls at a forward end of the vehicle for loading materials into the vehicle; and a positive drive and mounting assembly for supporting said elevator structure on said side walls, said assembly comprising: a rear end mounting means for movably mounting the rear end of said elevator structure relative to said bowl, and a pair of guide members, each including an elongated track element mounted at one end thereof to a respective side wall of said vehicle near the forward end of the latter, a pair of carriage members, each of which includes a roller mounted for rolling engagement on a respective one of said guide tracks and attached pivotally to a corresponding side portion at the front end of said elevator structure, each said guide member including means cooperable with the associated carriage member for confining said carriage member to linear, substantially vertical movement along the elongated track element and drive means mounted on said vehicle and connected to each of said carriage members for positively moving said carriage members along said guide track elements, thereby to position said elevator structure with respect to the forward end of said vehicle.

References Cited
UNITED STATES PATENTS

| | | | |
|---|---|---|---|
| 1,142,197 | 6/1915 | Murphy | 37—8 |
| 2,956,353 | 10/1960 | Hanner et al. | 37—8 |
| 3,292,278 | 12/1966 | Johnson | 37—8 |
| 3,334,428 | 8/1967 | Rezabek | 37—8 |
| 3,426,456 | 2/1969 | Keith et al. | 37—8 |
| 3,431,660 | 3/1969 | Keith et al. | 37—8 |
| 3,479,754 | 11/1969 | Duke et al. | 37—8 |

ROBERT E. PULFREY, Primary Examiner

E. H. EICKHOLT, Assistant Examiner

U.S. Cl. X.R.

37—129